(12) United States Patent
Burchert

(10) Patent No.: US 6,254,028 B1
(45) Date of Patent: Jul. 3, 2001

(54) DEVICE FOR DAMPING OSCILLATIONS OF A WINDING BOBBIN IN SPINNING, TWISTING OR WINDING MACHINES

(75) Inventor: Mathias Burchert, Deggingen (DE)

(73) Assignees: Fritz Stahlecker, Bad Überkingen; Hans Stahlecker, Süssen, both of (DE)

( * ) Notice: Subject to any disclaimer, the term of this patent is extended or adjusted under 35 U.S.C. 154(b) by 0 days.

(21) Appl. No.: 09/413,789

(22) Filed: Oct. 7, 1999

(30) Foreign Application Priority Data

Nov. 19, 1998 (DE) .............................. 198 53 316

(51) Int. Cl.⁷ .......................... B65H 54/42; B65H 54/54
(52) U.S. Cl. ...................................... 242/486.2; 242/486.4
(58) Field of Search ............................ 242/486.2, 486.4, 242/486.5, FOR 165

(56) References Cited

U.S. PATENT DOCUMENTS

| | | | |
|---|---|---|---|
| 4,102,506 | * 7/1978 | Raasch et al. | 242/486.4 |
| 4,718,615 | * 1/1988 | Hefti et al. | 242/486.2 |
| 5,639,036 | * 6/1997 | Flamm | 242/486.2 |
| 5,692,367 | * 12/1997 | Stahlecker | 242/486.2 X |
| 5,697,565 | * 12/1997 | Zitzen | 242/486.4 |

FOREIGN PATENT DOCUMENTS

3809421 A1   10/1988   (DE).

* cited by examiner

*Primary Examiner*—Michael R. Mansen
(74) *Attorney, Agent, or Firm*—Evenson, McKeown, Edwards & Lenahan, P.L.L.C.

(57) ABSTRACT

A damping device is provided for damping the oscillations of a winding bobbin in spinning, twisting or winding machines. A bobbin holder, which can be swivelled around a swivel axle affixed to the machine, supports the rotatably supported winding bobbin, which is pressed against a drive roller. Damping elements act in swivel directions of the bobbin holder, the effect of the damping elements being greater in the swivel direction of the winding bobbin when it is raised from the drive roller than in the swivel direction when the winding bobbin is pressed against the drive roller. A friction jaw is provided for damping, which, with its pressing surface is pressed by resilient forces against a friction surface in the form of a cylinder surface. The axis of the cylinder surface is the swivel axle of the bobbin holder. The resilient force which loads the pressing surface exerts a moment on the bobbin holder, which tends to lift the winding bobbin from the drive roller. When the winding bobbin is raised from the drive roller, the pressing surface is thus drawn more firmly to the cylinder surface, which increases the damping effect, whereas in the other swivel direction the pressing surface yields flexibly, which weakens the damping effect.

12 Claims, 1 Drawing Sheet

DEVICE FOR DAMPING OSCILLATIONS OF A WINDING BOBBIN IN SPINNING, TWISTING OR WINDING MACHINES

BACKGROUND AND SUMMARY OF THE INVENTION

This application claims the priority of German application 198 53 316.0, filed in Germany on Nov. 19, 1998.

The present invention relates to a device for damping oscillations of a winding bobbin in spinning, twisting or winding machines, comprising a bobbin holder which can be swivelled around an axle, which bobbin holder supports a rotatably supported winding bobbin, which is pressed against a drive roller, also comprising damping elements which act in the swivel direction, said damping elements comprising a friction jaw disposed by resilient forces on a friction surface, which forms a friction pairing with the friction jaw, the damping effect of which friction pairing is greater in the swivel direction when the winding bobbin is lifted from the drive roller than in the swivel direction when the winding bobbin is pressed onto the drive roller.

The idea of the damping of the bobbin holders is to suppress the winding bobbins from lifting up. Movement away from the drive roller must be intercepted, slowed down and reduced in its distance. The return movement back to the drive roller should not, in contrast, be braked. The winding bobbin should be disposed on the drive roller with a constant pressure. Thus a damping is needed which acts only when the winding bobbin is lifted suddenly from the drive roller, which damping then also acts when a spontaneous lifting motion occurs, but which immediately leaves off when the winding bobbin executes a counter-movement towards the drive roller.

A device of the above mentioned type is prior art in German published patent application 38 09 421 corresponding to British Patent Document 6B 2204334. This device comprises a tube connected to the bobbin holder for taking up a ball pivot as well as a rotatably supported connecting rod on the machine frame. A guiding holder, slidably surrounding the connecting rod, is connected to a shaft of the ball pivot. At least one friction jaw, disposed on the connecting rod, is suspended.

Thus the device, comprising a plurality of articulation points, for damping the oscillations of the winding bobbin has on the one hand a complicated design, and on the other hand is only satisfactorily effective when sufficient narrow tolerances are provided at the articulation points. After a longer period of operation, the tolerances increase, whereby the damping effect of the device is impaired.

It is an object of the present invention to create a simply designed device for damping winding bobbins, which still functions reliably after a long period of operation.

This object has been achieved in accordance with preferred embodiments of the present invention in that the friction pairing comprises a cylinder surface applied fixedly to the bobbin holder, the axis of which cylinder surface is the swivel axis of the bobbin holder, and also comprising a plane pressing surface, the resilient forces which load the pressing surface exerting a moment on the bobbin holder, which tends to lift the winding bobbin from the drive roller.

As a result of the features of the invention, a friction damping arises, which does not have the disadvantages of standard friction brakes, in which the braking effect is equal in both directions. The disadvantages explained above in association with the above mentioned prior art do not arise, whereby the damping effect is reduced with increasing operation time. It is rathermore a friction damping which is created, which makes advantageous use of a wedge effect, whereby in one swivel direction of the bobbin holder the pressing force between cylinder surface and pressing surface is increased and in the other swivel direction is weakened. The arranged effective line of the resilient force according to the present invention ensures that when the winding bobbin is suddenly lifted from its drive roller, the damping effect is suddenly increased and that in the other swivel direction the damping effect immediately decreases.

For reasons of cost-effective production it is practical when the pressing surface is arranged onto the friction jaw, and when the cylinder surface is the friction surface which acts together with the pressing surface.

In preferred embodiments of the invention, the friction jaw, preferably in the form of a wedge, is advantageously slidably supported on a sliding guide, which is arranged parallel to the line of influence of the resilient force. The sliding guide forms a wedge-shaped gap with the cylindrical surface of the bobbin holder. The wedge is drawn into the wedge-shaped gap as a result of the frictional forces arising during a swivel movement, when the winding bobbin is lifted from the drive roller, while during the other swivel movement the wedge is less firmly pressed against the cylinder surface, as the latter has the tendency to push the wedge against the effect of the spring.

The cylinder surface preferably has in circumferential direction a length which is adapted to the smallest possible and also to the largest possible diameter of the winding bobbin. This results in the same frictional and thus damping ratios, independent of the fullness of the winding bobbin, being maintained.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
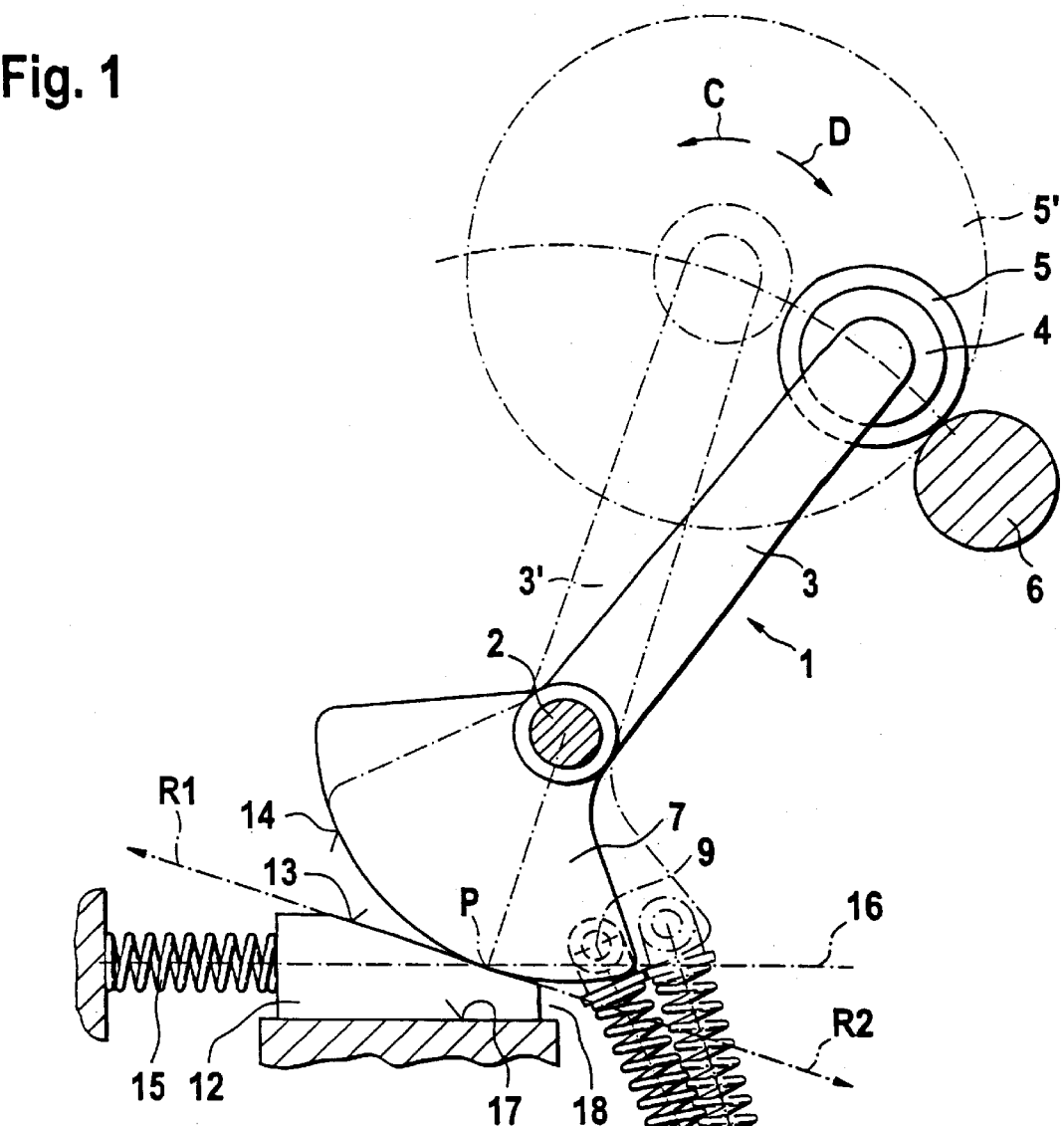
FIG. 1 is a schematic representation of a partly sectional side view of a bobbin holder comprising the device of the present invention for damping the winding bobbin.

The bobbin holder 1 shown in FIG. 1 is supported on a machine-affixed swivel axle 2 in such a way that it can swivel. In the case of a spinning, twisting or winding machine, a plurality of such bobbin holders 1 are arranged adjacently in a row.

Each bobbin holder 1 has two lateral supporting arms 3, each of which supports in a known way a so-called winder plate 4. The tube to be provided with a bobbin is fixed between the two winder plates 4 under the action of a spring (not shown), in such a way that the winding bobbin 5 to be wound on the respective tube is rotatably supported. During operation, the respective winding bobbin 5 is disposed on a drive roller 6 which is driven to rotate. Drive rollers 6 of this kind extend usually in longitudinal direction of the machine. The other devices arranged at the winding station, for example a traversing yarn guide, are not shown here, as they have nothing to do with an understanding of the present invention.

On the side of the swivel axle 2 facing away from the drive roller 6, the bobbin holder 1 is provided with an extension 7, on which a pressure spring 8 engages. The pressure spring 8, in the form of a dead center spring to be described below, engages in a link point 9 of the extension 7 and is supported on the other end by means of an articulation point 10 on the machine frame 11.

At the beginning of a winding process, after an empty tube has been placed in the bobbin holder 1, the pressure spring 8—shown by a continuous line—is so aligned that, by means of a lever action a loading force on the winding bobbin 5 in the direction towards the drive roller 6 is generated. With increasing fullness of the winding bobbin 5, the supporting arms 3 swivel gradually according to the swivel direction C away from the drive roller 6, whereby the winding bobbin 5 is still disposed on the drive roller 6. With increasing swivel movement in the swivel direction C, the line of influence of the pressure spring 8 changes in that after a certain length of time it is directed against the swivel axle 2, and thus no longer exerts pressure on the winding bobbin 5. At this time, the winding bobbin 5 is disposed only with its own weight on the drive roller 6. When the winding bobbin 5 is fuller, which is denoted by a dot-dash line and 5', the supporting arms 3 reach a position 3', in which the line of influence of the pressure spring 8—see also position 8'—acts in such a way that the pressure spring, instead of the previous loading force, now effects a relief force. By using such a dead center spring, the pressure of the winding bobbin 5 on the drive roller 6 remains more or less constant.

During operation the winding bobbin 5 has the tendency to run unevenly, to jump upwards, or even to rise from the drive roller 6 for a short moment. Such oscillations must be damped. The damping elements provided for this purpose are now described below.

It is important that the damping is only effective in swivel direction C, while in the other direction, namely swivel direction D, that is towards the drive roller 6, it is not present at all if possible. These variations of the damping effect should furthermore occur if possible without any time delay. The device for damping according to the present invention fulfills these requirements.

The damping elements comprise as an important component a friction jaw 12, which is in the form of a wedge. This wedge has a plane, slanted pressure surface 13, which is disposed on a cylinder surface 14 of the extension 7 of the bobbin holder 1. The axis of the cylinder surface 14, which forms a friction surface for the friction jaw 12, is the swivel axle 2. In FIG. 1, the pressure surface 13 is disposed at a point P on the cylinder surface 14. In reality, point P is, however, a line contact transverse to the plane of projection. The friction pairing between the plane pressure surface 13 and the cylinder surface 14 does not necessarily have to have a high friction coefficient. It is more important that the friction coefficient remains constant, even in the case of a certain amount of wear, over a long period of time. When the extension 7 is made of steel and the friction jaw 12 is made of plastic, the result is a coefficient in the order of magnitude of between 0.1 and 0.2. The wedge angle of the plane pressure surface 13 of the friction jaw 12 should, in order to avoid locking, measure at least 12° in the case of the chosen friction pairing. Advantageously, the wedge angle measures approximately 20°.

The friction jaw 12 is loaded with a pressure spring 15, whose line of influence extends through the point P and runs past the swivel axle 2 at a distance in such a way that a moment is exerted on the bobbin holder 1, which has the tendency to lift the winding bobbin 5 from the drive roller 6.

This lifting up does not, of course, occur, as the own weight of the winding bobbin 5 as well as the pressure spring 8 when the bobbin is not very full—counteract this.

The wedge-like friction jaw 12 is guided slidably on a sliding guide 17, which extends parallel to the line of influence 16 of the pressure spring 15. The sliding guide 17 forms together with the cylinder surface 14 of the bobbin holder 1 a wedge-shaped gap 18.

Figure 2:
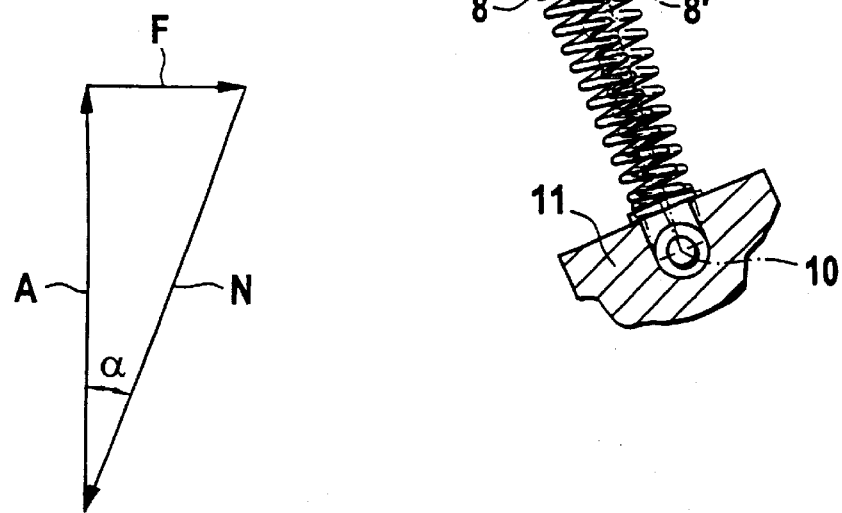
FIG. 2 is a polygon of those forces which act on the friction jaw when the winding bobbin is at a standstill.

For the case shown in FIG. 1, however with standstill of the winding device, the forces shown in a polygon of forces in FIG. 2 act on the friction jaw 12. The spring force F can be seen first, which extends from the left against the friction jaw 12 in the direction of the dot-dash line of influence 16. As the plane pressing surface 13 is disposed on the cylinder surface 14, a normal force N acts in point P, which force N is also entered in the polygon of forces. The sliding guide 17 loads the friction jaw 12 with a resulting supporting force A, which extends perpendicularly to the line of influence 16. Between the arrows of the normal force N and the supporting force A, there is a wedge angle $\alpha$, which is identical in size to the angle of the wedge of the friction jaw 12.

As soon as sudden oscillating movements of the bobbin holder 1 arise, a friction force $R_1$ or $R_2$,—depending on the swivel direction—acts on the cylinder surface 14, which corresponds to the normal force N, multiplied by the friction coefficient $\mu$, These friction forces R, or R2 act with reversed arrow direction as reaction forces on the wedge-like friction jaw 12.

When the winding process takes place, that is when the winding bobbin 5 is driven by the drive roller 6 to rotational movements, the above mentioned magnitude of the friction forces $R_1$ or $R_2$ when the swivel movements of the bobbin holder 1 begin is only present in the very first few seconds. Due to the flexible pressure of the friction jaw 12 on the cylinder surface 14 by means of the pressure spring 15, the friction forces $R_1$ and $R_2$ are different, depending on the swivel direction.

The instance in which the actual damping effect should set in is now considered:

When, for example due to any kind of unevenness of the periphery of the winding bobbin 5, the latter has the tendency to lift upwards from its drive roller 6, then a reaction force $R_2$, caused by friction, acts in point P on the friction jaw 12 in the plane surface 13, which reaction force $R_2$ has the tendency to pull the friction jaw 12 even further into the wedge-shaped gap 18. This results in a sudden increase in the normal force N, whereby, equally suddenly, the damping effect, caused by the friction, is also noticeably increased. The lifting off of the winding bobbin 5 from the drive roller 6 is thus rendered increasingly difficult, with the result that the winding bobbin 5 remains practically pressed against the drive roller 6.

The other swivel direction is now considered: Should the winding bobbin 5 have, for whatever reason, a recess on its surface, and a tendency to lie on the drive roller 6, then this process of motion is not hindered by the friction. The friction force occurring in the case of this swivel direction acts namely as reaction force $R_1$ in such a way on the plane surface 13 of the wedge-like friction jaw 12, that the friction jaw 12 has the tendency to evade the spring force F, that is, tends to lift up from the cylinder surface 14. This promptly reduces the friction force and thus also the damping effect, whereby the winding bobbin 5, without practically any perceivable damping, is disposed rapidly on the drive roller 6.

The embodiment of the damping elements according to the present invention also ensures that when the winding bobbin 5 is lifted from the drive roller 6, the damping effect is increased and when the winding bobbin 5 is pressed onto the drive roller 6, the damping effect is reduced. This is exactly the aim of the present invention.

As can be seen from FIG. 1, the cylinder surface 14 has a length in circumferential direction, which is such that the cylinder surface 14 is disposed on the plane pressing surface 13 in the case of the smallest of winding bobbin 5 diameters and also the largest of winding bobbin 5 diameters. The contact line also goes through point P. This means that—independently of the degree of fullness of the winding bobbin 5—a constant damping effect is maintained, namely a strong damping effect in the case of the swivel direction C and a weak damping effect in the case of swivel direction D.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bobbin holder support assembly for supporting a winding bobbin holder which is pivotally mounted at a textile machine pivot axle, said bobbin holder assembly comprising:

an extension of the bobbin holder at a side of said pivot axle opposite a side supporting a bobbin, said extension including a cylindrical surface segment, a planar pressing surface member abuttingly engageable in use with the cylindrical surface segment, and a spring acting to force the planar pressing surface member toward a position wherein the planar surface member exerts a moment on the bobbin holder having a tendency to lift a winding bobbin held by the bobbin holder from a bobbin drive roller.

2. A bobbin holder support assembly according to claim 1, wherein the planar pressing surface member is a wedge member having a planar sliding surface, said spring acting to slide the wedge member along the sliding surface, and wherein the wedge includes a planar pressing surface which is inclined with respect to the planar sliding surface, said planar pressing surface being in abutting frictional engagement with the cylindrical surface segment.

3. A bobbin holder support assembly according to claim 2, wherein the cylindrical surface segment has a length in circumferential direction which is adapted to the smallest possible and to the largest possible winding bobbin diameters.

4. A bobbin holder support assembly according to claim 1, wherein the cylindrical surface segment has a length in circumferential direction which is adapted to the smallest possible and to the largest possible winding bobbin diameters.

5. A bobbin holder support assembly according to claim 1, comprising a bobbin holder driver roller engageable with the bobbin holder and yarn wound thereon to rotatably drive same, and a pressure spring connected to the extension of the bobbin holder and operable to apply varying pressure forces on the bobbin holder responsive to changes in the size of the yarn winding on the bobbin holder.

6. A bobbin holder support assembly according to claim 5, wherein the pressure spring is configured to apply forces on the bobbin holder pressing the bobbin holder drive roller when the bobbin holder contains less than a predetermined size of yarn winding and to apply forces relieving the bobbin holder from the drive roller when the bobbin holder contains more than a predetermined size winding.

7. A bobbin holder support assembly for supporting a winding bobbin holder which is pivotally mounted at a textile machine pivot axle, said bobbin holder assembly comprising:

an extension of the bobbin holder at a side of said pivot axle opposite a side supporting a bobbin, said extension including a cylindrical surface segment, a planar pressing surface member abuttingly engageable in use with the cylindrical surface segment, and a resilient means acting to force the planar pressing surface member toward a position wherein the planar surface member exerts a moment on the bobbin holder having a tendency to lift a winding bobbin held by the bobbin holder from a bobbin drive roller.

8. A bobbin holder support assembly according to claim 7, wherein the planar pressing surface member is a wedge member having a planar sliding surface, said resilient means acting to slide the wedge member along the sliding surface, and wherein the wedge includes a planar pressing surface which is inclined with respect to the planar sliding surface, said planar pressing surface being in abutting frictional engagement with the cylindrical surface segment.

9. A bobbin holder support assembly according to claim 8, wherein the cylindrical surface segment has a length in circumferential direction which is adapted to the smallest possible and to the largest possible winding bobbin diameters.

10. A bobbin holder support assembly according to claim 7, wherein the cylindrical surface segment has a length in circumferential direction which is adapted to the smallest possible and to the largest possible winding bobbin diameters.

11. A bobbin holder support assembly according to claim 7, comprising a bobbin holder driver roller engageable with the bobbin holder and yarn wound thereon to rotatably drive same, and a pressure spring connected to the extension of the bobbin holder and operable to apply varying pressure forces on the bobbin holder responsive to changes in the size of the yarn winding on the bobbin holder.

12. A bobbin holder support assembly according to claim 11, wherein the pressure spring is configured to apply forces on the bobbin holder pressing the bobbin holder drive roller when the bobbin holder contains less than a predetermined size of yarn winding and to apply forces relieving the bobbin holder from the drive roller when the bobbin holder contains more than a predetermined size winding.

* * * * *